United States Patent [19]

Matsuta et al.

[11] Patent Number: 5,260,839
[45] Date of Patent: Nov. 9, 1993

[54] TIME BASE CORRECTOR

[75] Inventors: Toyohiko Matsuta, Katano; Tokikazu Matsumoto, Osaka, both of Japan

[73] Assignee: Matsushita Electric Industrial Co., Ltd., Osaka, Japan

[21] Appl. No.: 670,580

[22] Filed: Mar. 18, 1991

[30] Foreign Application Priority Data

Mar. 22, 1990 [JP] Japan .................................. 2-073026
Mar. 22, 1990 [JP] Japan .................................. 2-073028

[51] Int. Cl.⁵ .............................................. H04N 5/78
[52] U.S. Cl. .................................. 360/36.2; 358/320; 358/339
[58] Field of Search ................... 360/36.1, 36.2, 10.1, 360/10.3; 358/337, 339, 342, 320

[56] References Cited

U.S. PATENT DOCUMENTS

| | | | |
|---|---|---|---|
| 3,931,638 | 1/1976 | Lentz | 360/26 |
| 4,120,000 | 10/1978 | Ninomiya | 358/148 |
| 4,802,026 | 1/1989 | Kaneko et al. | 360/36.2 |
| 4,882,633 | 11/1989 | Nakatani et al. | 360/36.2 X |
| 4,905,101 | 2/1990 | Ohta et al. | 360/362 |
| 4,975,788 | 12/1990 | Yamanishi | 360/36.2 X |
| 5,072,315 | 12/1991 | Tsunashima | 360/36.2 |

FOREIGN PATENT DOCUMENTS 0217091 4/1987 European Pat. Off. .
0300633 1/1989 European Pat. Off. .

OTHER PUBLICATIONS

Bleidt, "A Digital Velocity and Amplitude Error-Correction System for Component Time Base Correctors," SMPTE Journal, vol. 97, No. 11, pp. 901-907, Nov. 1988.

Oku, et al, "High Picture Quality Technologies for an S-VHS Portable VCR," SMPTE Journal, vol. 98, No. 9, pp. 636-639, Sep. 1989.

"Overview of Time-Base Correction Technique and Their Application" by K. Sadashige, SMPTE Journal vol. 85, Oct. 1976, pp. 787-791.

Primary Examiner—Andrew L. Sniezek
Attorney, Agent, or Firm—Stevens, Davis, Miller & Mosher

[57] ABSTRACT

An input video signal is converted into a digital signal by a clock of a predetermined time interval. Of the time base errors included in the above signal, time base errors of the clock unit are corrected by resetting the write address of the memory, and time base errors of less than the clock unit and velocity errors are corrected by an interpolation filter provided at a later stage of the memory. By the above processing, it is possible to correct time base errors by only a clock of a predetermined interval and it is also possible to improve interface characteristics with other digital processing sections.

4 Claims, 8 Drawing Sheets

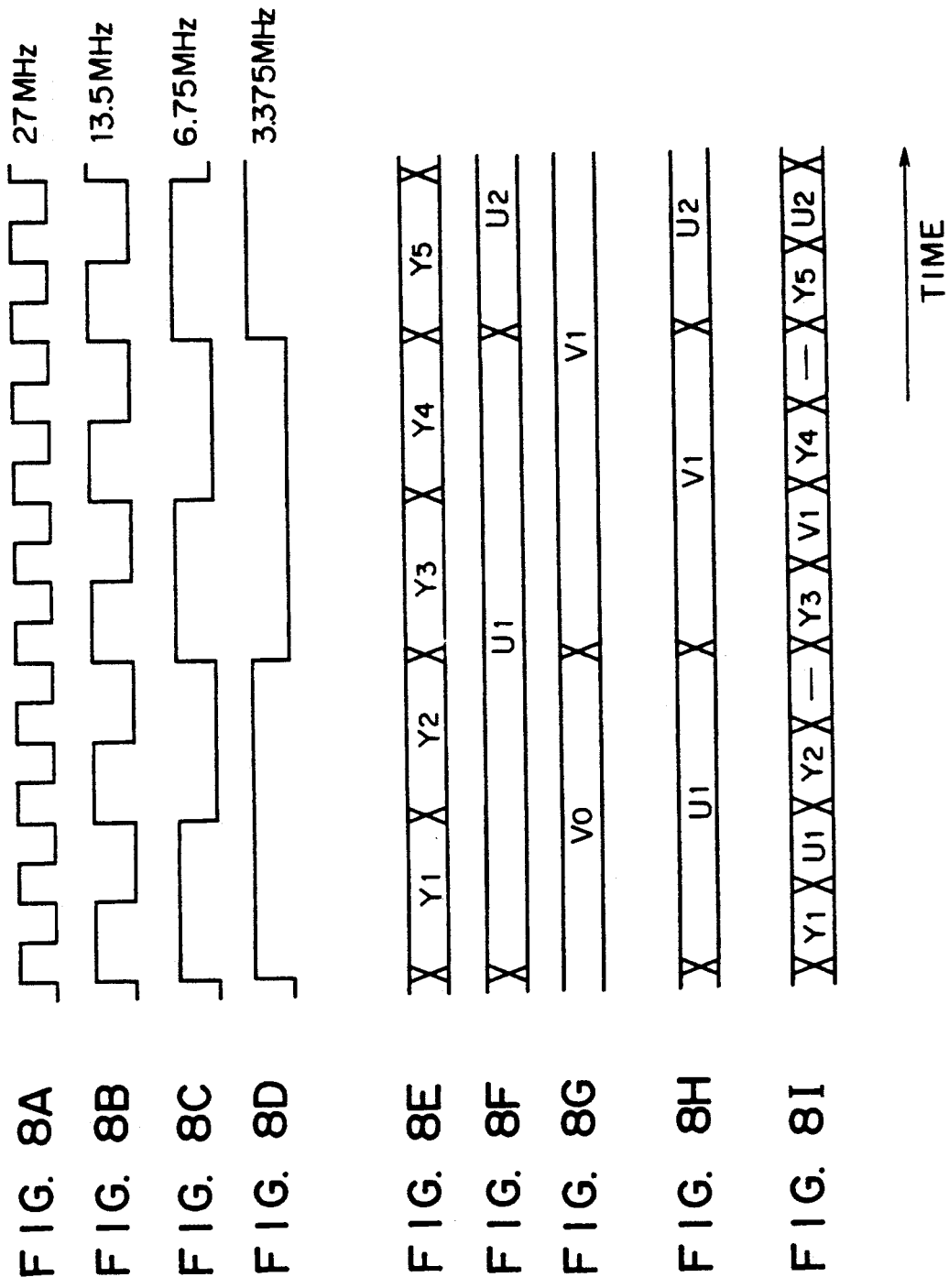

1

TIME BASE CORRECTOR

BACKGROUND OF THE INVENTION

1. Field of the Invention

The present invention relates to a time base corrector to be used for correcting time base variations included in reproduced signals of video tape recorders (VTR's) and laser disk players.

2. Description of the Related Art

There have been various methods which are used for a time base corrector. For example, in the U.S. Pat. No. 3,931,638, time base instability of signals is corrected by use of paired analog shift registers. While an input signal is being written in one of the shift registers by using a clock at a rate corresponding to its time base instability, the other shift register is read out at a uniform rate.

A time base corrector (hereinafter referred to as a TBC) using a variable delay line as other type of TBC is described in the "Overview of Time-Base Correction Techniques and Their Applications" by K. Sadashige, SMPTE Journal Vol. 85 Oct. 1976, pp. 781-791.

A digital TBC using a digital memory is also available as one of the main modern TBC's. An example of this type of TBC is found as disclosed in the U.S. Pat. No. 4,120,000. According to the TBC of this type, a video signal from a VTR is A/D converted by using a clock rate which follows a detected time base error and the A/D converted signal is written into the memory by using the same clock rate so that the time base error is corrected. The signal is read from the memory by using a clock which is obtained by phase modulating a reference clock in accordance with the quantity of a velocity error. The velocity error is corrected to obtain an output signal free from time base variations by D/A converting the signal which has been read from the memory by using the same clock.

According to the above method, however, the digital data before the D/A converter includes a velocity error. Therefore, there arises such an inconvenience that an attempt to carry out other processing in the state of digital data before the D/a converter will not be successful.

In order to solve the above problem, there is a TBC which uses an adaptive interpolation filter, as disclosed in the U.S. Pat. No. 4,905,101. This TBC corrects time base errors in a digital signal with an interpolation filter after an input signal has been converted into a digital signal in a predetermined sampling period.

However, the structure of absorbing such a large time base error as a skew in this method can not be said to be an idle one from the viewpoint of its circuit scale.

SUMMARY OF THE INVENTION

It is an object of the present invention to provide a time base corrector which can obtain a digital signal free from time base variations in a predetermined sampling period and which has a wide correction range, unlike the conventional time base corrector.

It is a second object of the present invention to provide a time base corrector having a reduced circuit scale for an interpolation unit which is structured to process a time base multiplex signal.

In order to achieve the above objects, the time base corrector of the present invention comprises a clock generator for generating a clock signal having a predetermined time interval, an A/D converter for sampling an input signal by an output clock signal of the clock generator and converting the sampled signal into a digital signal, a memory for temporarily storing the digital signal obtained by the A/D converter, a write address generator for resetting an address of the memory each time when a horizontal synchronizing signal of the digital signal obtained by the A/D converter is detected, a time base error detecting unit for detecting a time base error of the digital signal obtained by the A/D converter and outputting the time base error information obtained by an arithmetic processing based on the detected error, an interpolation unit for interpolating an amplitude of an output digital signal from the memory based on output time base error information from the time base error detecting unit to have a reference time base, and a D/A converter for converting an output of the interpolation unit into an analog signal by an output clock signal from the clock generator.

By having the above structure, it is possible to correct time base variations included in a video signal sampled in a predetermined time interval, without fluctuating the clock rate.

As a result, there occurs no inconvenience even if there is other digital signal processing system before the D/A converter, and a signal processing by high precision can be materialized with its great practical use.

BRIEF DESCRIPTION OF THE DRAWINGS

FIGS. 8A–8I are timing charts of time base multiplexing of the time base corrector in FIG. 6.

DESCRIPTION OF THE PREFERRED EMBODIMENTS

Figure 1:
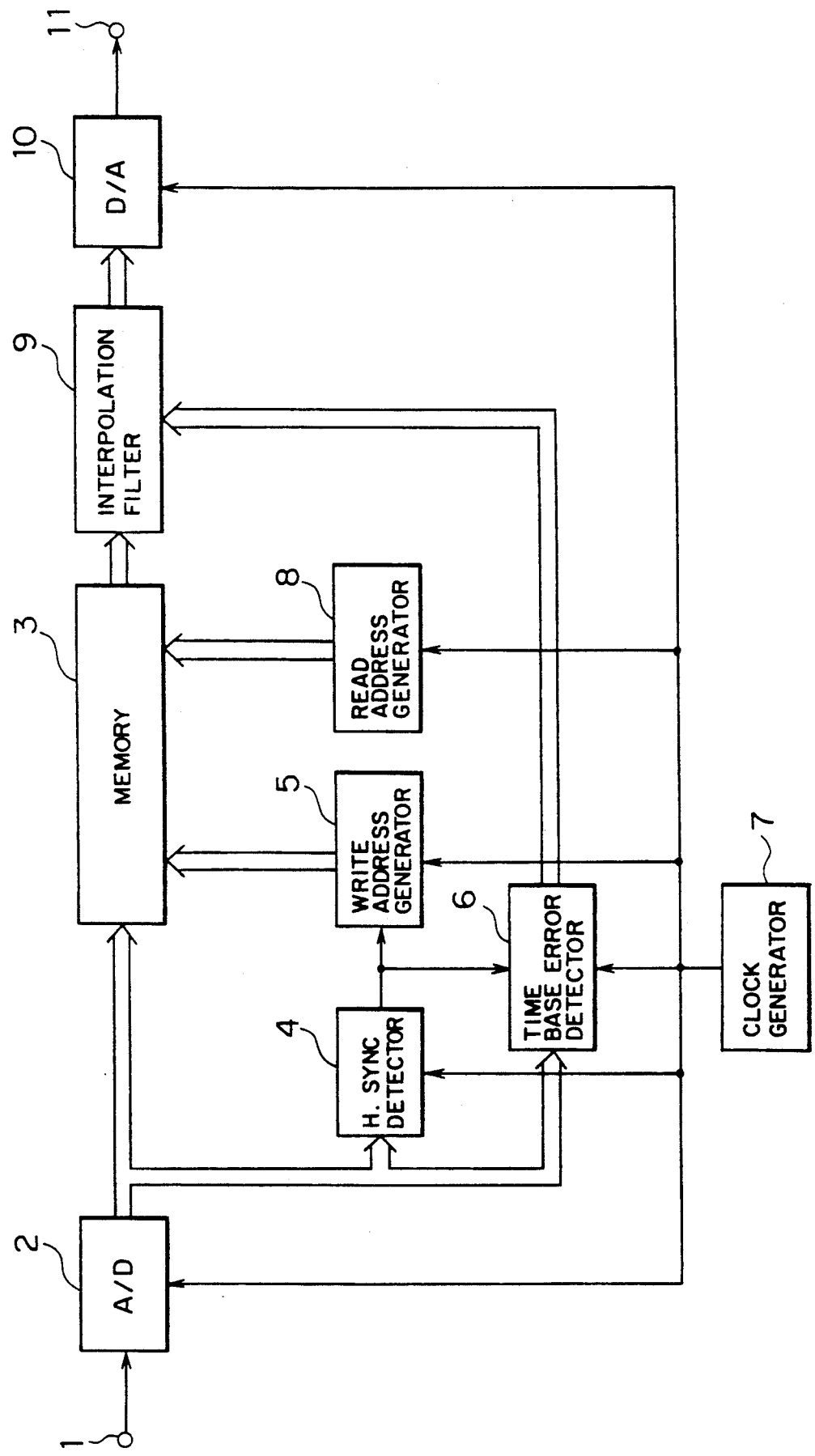
FIG. 1 is a block diagram illustrating a time base corrector in a first embodiment of the present invention.

FIG. 1 is a block diagram illustrating the main structure of the time base corrector in the first embodiment of the present invention. In FIG. 1, a reproduced video signal from the VTR or the like is applied from a terminal 1 to an A/D converter 2. The signal is then converted into a digital signal by the A/D converter 2 at a clock rate of a constant period outputted from a clock generator 7. An output from the A/D converter 2 is applied to a horizontal synchronizing (H. sync.) detector 4 to detect a synchronizing signal. A synchronizing detection signal produced from the H. sync. detector 4 is applied to a write address generator 5.

Figure 4:
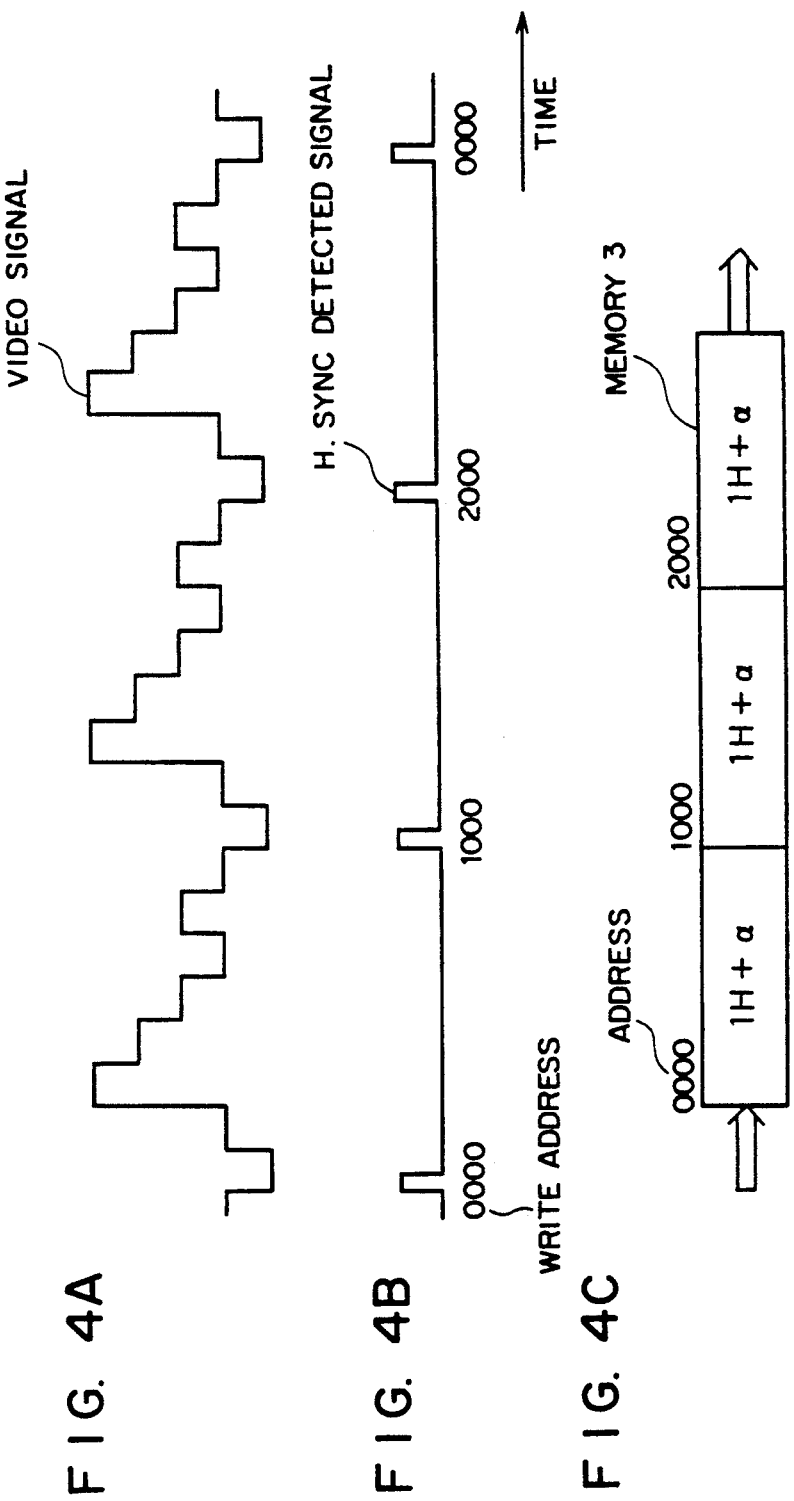
FIGS. 4A–4C are schematic diagrams showing a method of writing in a memory of the time base corrector in FIG. 1.

The write address generator 5 produces an output write address to the memory 3 by the clock produced from the clock generator 7. When a synchronizing detection signal is applied to the write address generator 5, the write address generator 5 resets a write address of the memory. In other words, each time when a synchronizing signal is detected, it is written by 1H from the header of the memory. For example, the memory 3 comprises three line memories having a capacity of 1H+α each, and the header address of each line memory is 0000, 1000 and 2000, as shown in FIG. 4C. When a video signal is applied as shown in FIG. 4A, a synchronizing detection signal is produced from the H. sync. detector 4 as shown in FIG. 4B. Upon receiving the synchronizing detection signal, the write address produced from the address generator 5 is cleared and this is shifted to the header address of the next line memory.

Figure 3:
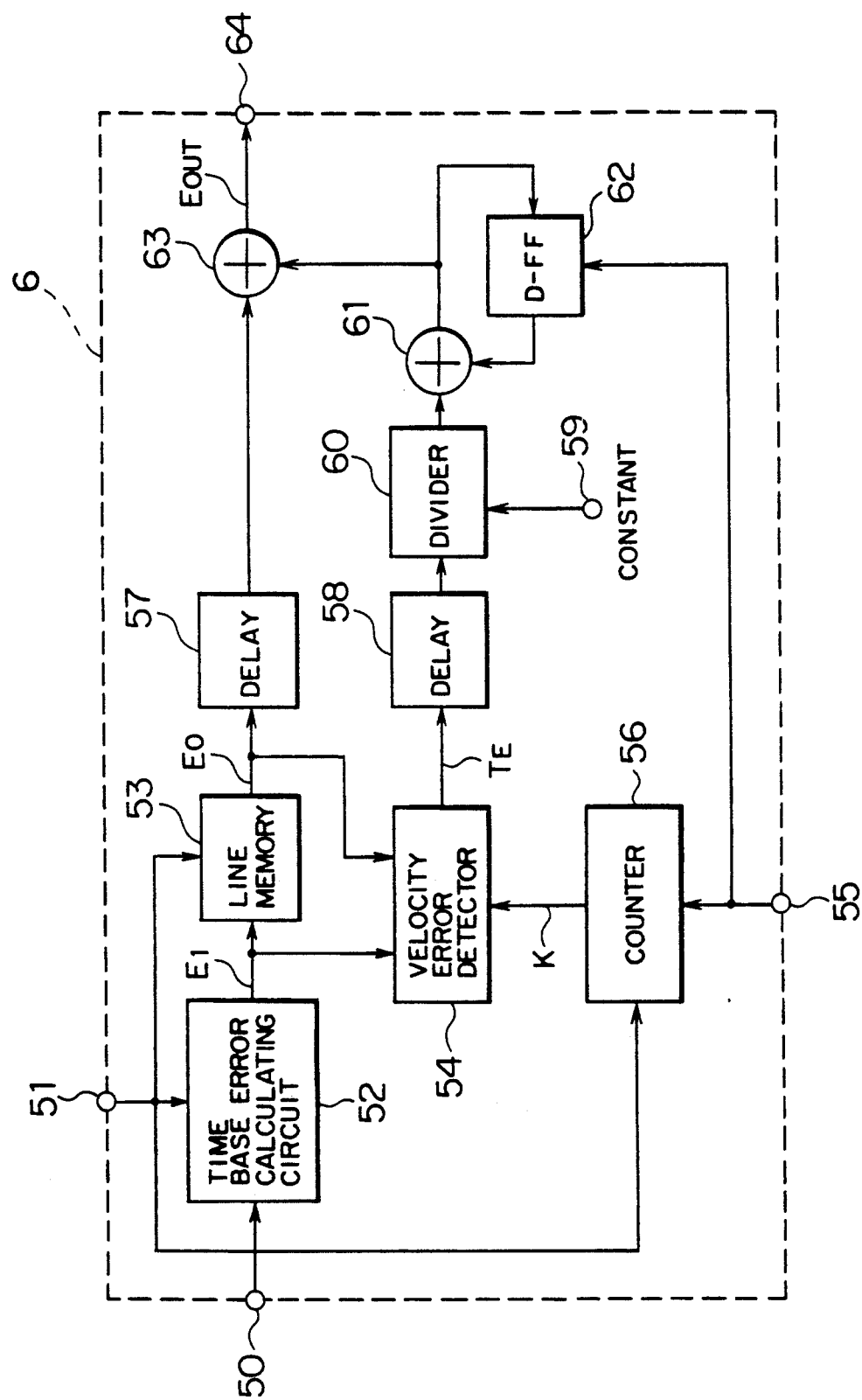
FIG. 3 is an example of the configuration of a time base error detecting unit for the time base corrector in FIG. 1.

Meanwhile, an output from the AD converter 2 is applied to a time base error detector 6. The time base error detector 6 will be explained below with reference to FIGS. 3 and 5.

Figure 5:
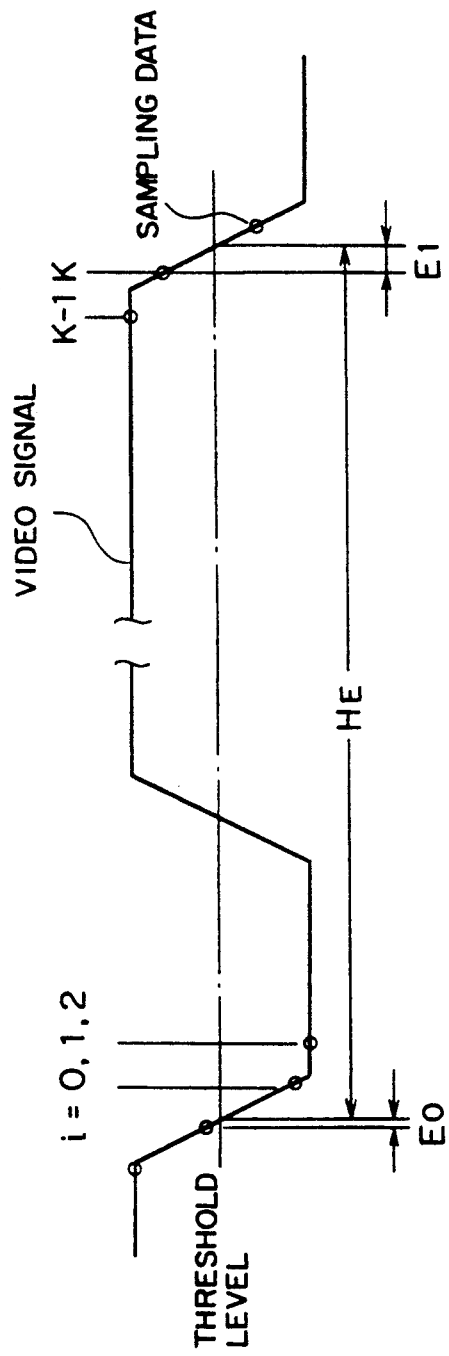
FIG. 5 is a schematic diagram for explaining the principle of the time base error detecting unit of the time base corrector in FIG. 1.

An output from the H. sync. detector 4 is applied to a time base error calculating circuit 52 from a terminal 51. A digital signal produced from the A/D converter 2 is also applied to the time base error calculating circuit 52 from a terminal 50. When a synchronizing signal has been detected, the time base error calculating circuit 52 detects a time base variation equal to or below one clock from any one of a color burst signal and a horizontal synchronizing signal. A case of using a horizontal synchronizing signal with this time base variation expressed as $E_1$ is shown in FIG. 5. This $E_1$ and a time base variation $E_0$ of 1H before produced from a line memory 53 are applied to a velocity error detector 54. In the mean time, a counter 56 counts clocks during a period from when the $E_0$ has been detected till when the $E_1$ has been detected, by using a clock applied from a terminal 55 and a synchronizing detection signal applied from a terminal 51, and applies a count value K to the velocity detector 54. By using the time k and $E_0$ and $E_1$, the velocity error detector 54 obtains a time $H_E$ of this 1H from the following expression:

$$H_E = (1-E_0) + k + E_1$$

The time base error $T_E$ is obtained from the time of the $H_E$ with respect to the accurate time $H_O$ of the 1H, and this is detected from the velocity error detector 54.

$$T_E = H_O - H_E$$

The $T_E$ and $E_0$ are applied to each of delay with 57 and 58 so that they are delayed to match the timing of reading data from the memory 3. Then, the following expression is processed by a divider 60, adders 61 and 63 and a flip-flop 62, to obtain time base error information $E_{OUT}$:

$$E_{OUT} = E_0 + (T_E/858) \times i$$

where i is a value taken from a range of 0 to 858. i is 0 in the case of a header address of the line memory, and this can be realized by a structure of an integrator comprising the adder 61 and the flip-flop 62. The constant of 858 in the above expression is a number of clocks of 1H when the clock frequency is 13.5 MHz.

The $T_E$ in the above expression can take a value of 0 deliberately. When $T_E = 0$, it is not possible to correct a velocity error but it is possible to simplify the structure of the time base error detector 6.

The time base error information $E_{OUT}$ is produced from a terminal 64 and is applied to an interpolation filter 9.

Further, a read address produced from a read address generator 8 by the memory 3 is sequentially applied to the interpolation filter 9. The read address generator 8 generates a read address by the clock produced from the clock generator 7. For example, when the clock frequency is 13.5 MHz, 1H becomes 858 samples. Therefore, after the 858 data is read out, the address is reset to the header address of the next line memory.

An output from the memory 3 applied to the interpolation filter 9 is produced after interpolating the amplitude of the input signal based on the time base error information obtained by the time base error detector 6.

The principle of the interpolation filter 9 will be briefly explained below. An output V(t) of the interpolation filter 9 at a desired time t is obtained from a sample value V(KT) which is near the output V(t) by the following expression:

$$V(t) = \sum_{k=-n}^{n} V(KT) \cdot S(t - KT)$$

where T is a sampling interval and S(t) is an interpolation function, taking an impulse response of a cosine roll-off LPF, for example.

Description will be made below with reference to an example of the configuration of the interpolation filter 9 shown in FIG. 2.

Figure 2:
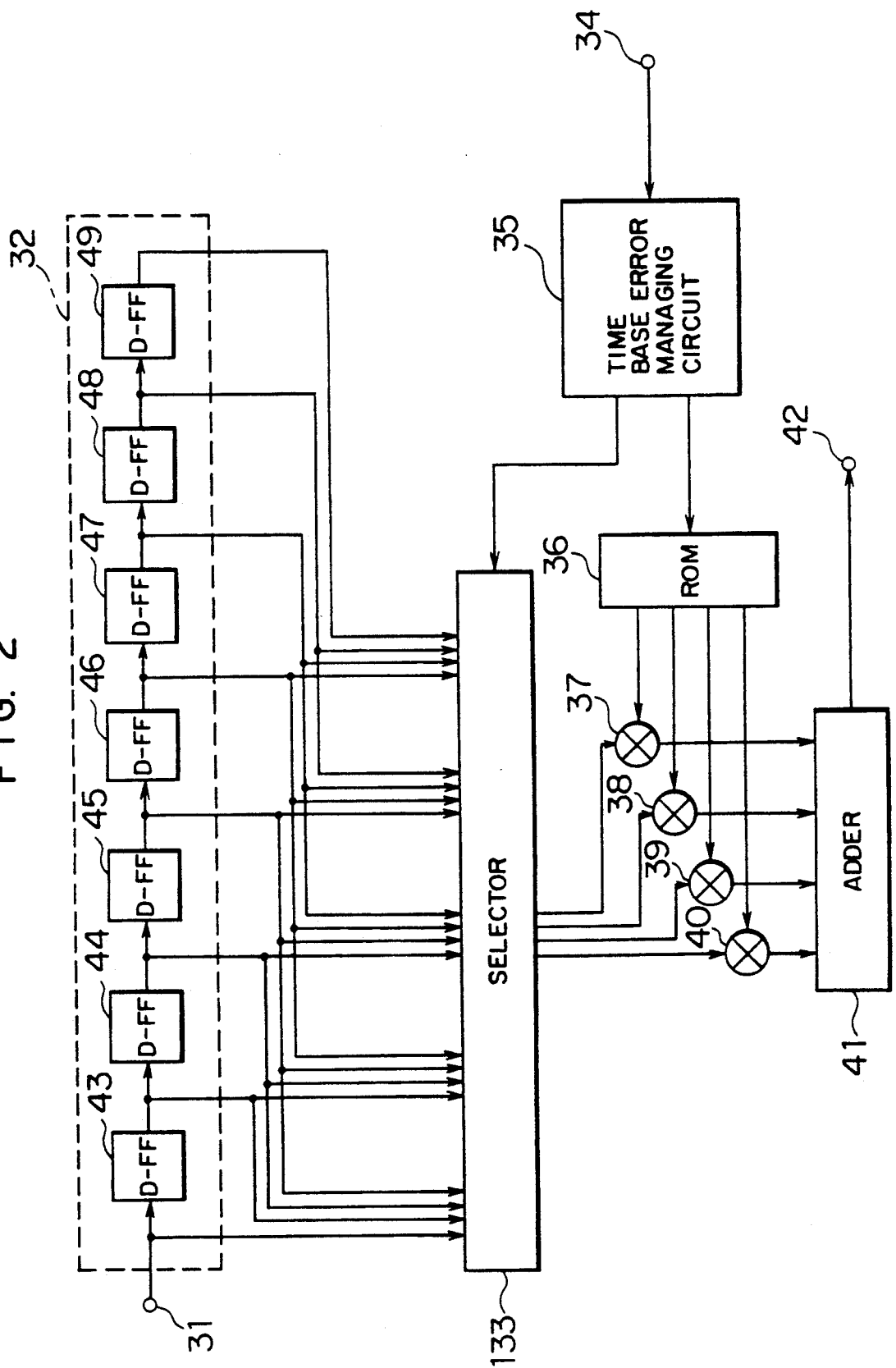
FIG. 2 is an example of the configuration of an interpolation unit for the time base corrector in FIG. 1.

FIG. 2 shows a case of interpolating based on four samples near the time of interpolation, as an example.

A signal from the memory 3 is applied to a shift register 32, and a signal before one clock is sequentially applied to flip-flops 43 to 49. A plurality of sets of data is applied to a selector 33 from the shift register 32 by using data of four clocks as one set.

Time base error information produced from the time base error decoder 6 is applied from a terminal 34 to a time base error processing circuit 35. The time base error processing circuit 35 divides the time base error information between time base error of clock unit and time base error of one clock time or below. The clock in this case refers to a clock used at the time of sampling. Time base error of clock unit is applied to a selector 33, and a set of data is produced from the selector 33 based on the input information. Data selected by the selector 33 is applied to each of multipliers 37 to 40.

Time base error of one clock time or below produced from the time base error processing circuit 35 is applied to a ROM 36. The ROM 36 generates coefficients of impulse response for interpolation based on time base error of inputted one clock time or below, and applies the coefficients to the multipliers 37 to 40.

The multipliers 37 to 40 multiply data with the coefficients and produce the results to an adder 41. The adder 41 adds the outputs from the multipliers 37 to 40 and produces an output of the interpolation filter 9 from the terminal 42.

As a result, a signal outputted from the interpolation filter 9 becomes a signal having a reference time base.

The output from the interpolation filter 9 is applied to a D/A converter 10 and is converted into an analog signal by a clock of a constant time interval produced from the clock generator 7. The converted analog signal is produced as a time-base variation corrected signal from a terminal 11.

As described above, according to the present embodiment, it is possible to detect time base variations from a signal which has been standardized by a clock of a constant time interval and to correct the time base variations by using an interpolation unit on the same clock.

Figure 6:
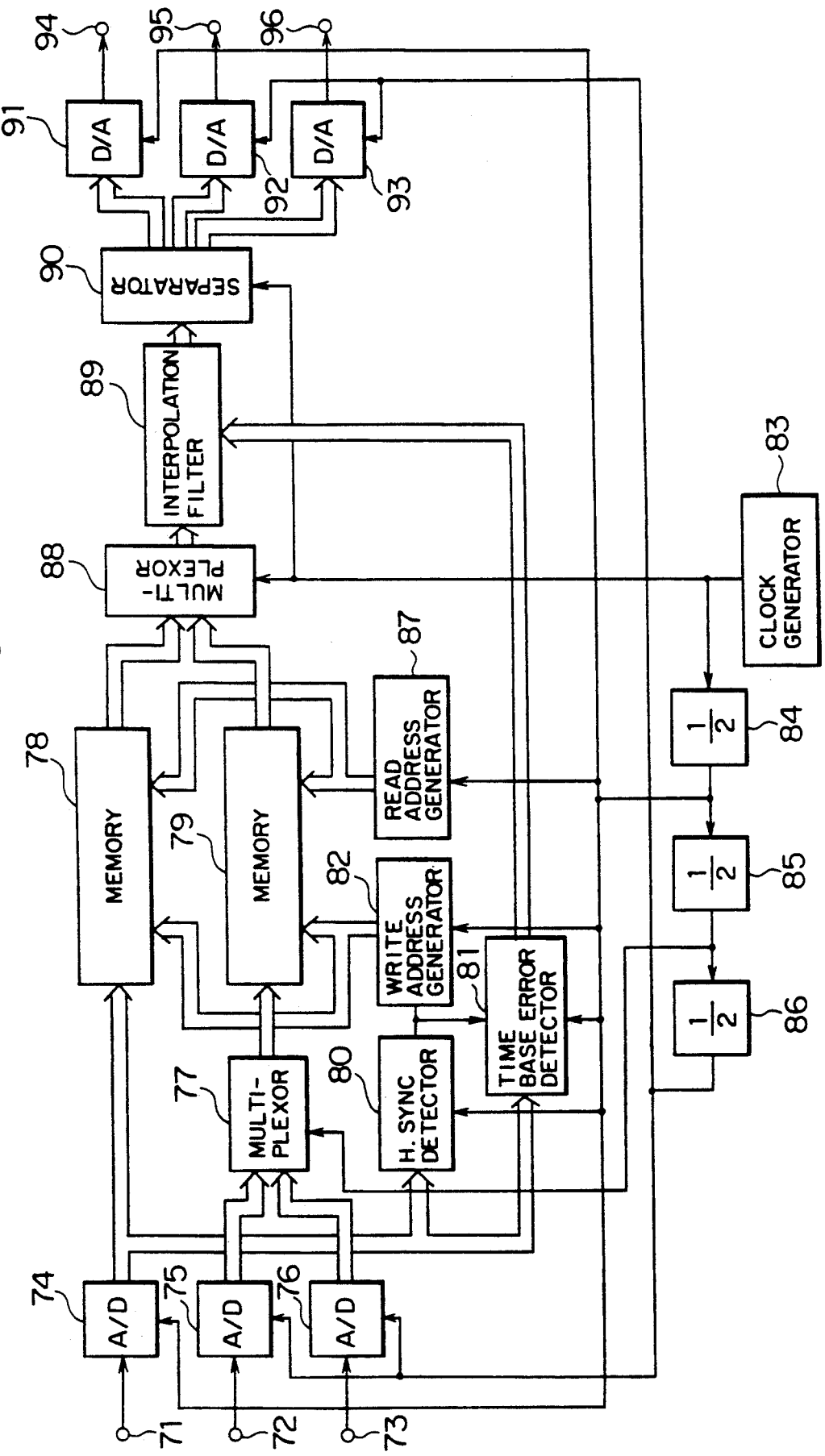
FIG. 6 is a block diagram illustrating the time base corrector in a second embodiment of the present invention.

FIG. 6 is a block diagram illustrating a main structure of the time base corrector in the second embodiment of the present invention. In FIG. 6, a signal Y, a signal U and a signal V including time base variations are applied from terminals 71, 72 and 73 to A/D converters 74, 75 and 76, respectively.

A clock of a constant period is produced from a clock generator 83. The clock frequency is set at 27 MHz, for example. An output from the clock generator 83 is converted into a half frequency of 13.5 MHz by a frequency divider 84. The output of the frequency divider 84 is applied to a frequency divider 85 to further halve the frequency to 6.75 MHz. Further, the output of the frequency divider 85 is applied to a frequency divider 86 to obtain a further halvened frequency of 3.375 MHz. Relationships of the above clocks are shown in FIGS. 8A to 8D.

The A/D converter 74 converts an input signal Y into a digital signal by a clock of a constant period produced from the frequency divider 84. FIG. 8E shows a relationship between the signal and the clock on the time base. A signal U and a signal V are converted into digital signals by the clock from the frequency divider 86. FIGS. 8F and 8G show relationships between the signal and the clock on the time base. In the present embodiment, a sampling phase of the signals between the signal U and the signal V is differentiated by 180 degrees. Outputs of the A/D converters 75 and 76 are applied to a multiplexor 77 so as to be time base multiplexed by the clock of the frequency divider 85, and the results are applied to a memory 79 for color signals. FIG. 8H shows a relationship between the signal and the clock on the time base.

An output from the AD converter 74 is applied to the H. sync. detector 80 to detect a synchronizing signal. A synchronizing detection signal produced from the H. sync. detector 80 is applied to a write address generator 82.

The write address generator 82 produces write addresses and stores them in memories 78 and 79 by the clock produced from the frequency divider 84. The write address generator 82 resets the addresses stored in the memories 78 and 79 each time when a synchronizing signal is applied, in the same manner as the write address generator 5 explained above in the first embodiment. Digital signals are sequentially written in the memories 78 and 79 in accordance with the addresses produced from the write address generator 82.

In the mean time, an output from the AD converter 74 is applied to a time base error detector 81. The time base error detector 81 is the same as the time base error detector 6 explained in the first embodiment. Time base error information $E_{OUT}$ produced from the time base error detector 81 is applied to an interpolation filter 89.

Digital signals are sequentially applied to a multiplexor 88 from the memories 78 and 79 in accordance with the read addresses produced from a read address generator 87. The read address generator 87 produces a read address by the clock produced from the frequency divider 84. For example, when the clock frequency is 13.5 MHz, 1H becomes 858 samples. Therefore, after the 858 data is read, the address is reset to the header address of the next line memory.

Signals applied to the multiplexor 88 from the memories 78 and 79 are time base multiplexed by the clock produced from a clock generator 83 and then are applied to the interpolation filter 89. FIG. 8I shows a relationship between the signals and the clock on the time base. The signals $Y_1$ and $U_1$ and $Y_3$ and $V_1$ illustrated in FIG. 8I are obtained in the sampling time and therefore have the same time base error.

A signal is applied from the multiplexor 88 to the interpolation filter 89 after interpolating the amplitude of the input signal based on the time base error informaiton obtained from the time base error detector 81.

The principle of the interpolation filter 89 will be briefly explained below. An output V(t) from the interpolation filter 89 at a desired time t is obtained from a near sample value V(KT) by the following expression:

$$V(t) = \sum_{K=-n}^{n} V(KT) \cdot S(t - KT)$$

where T is a sampling interval and S(t) is an interpolation function having an impulse response of a cosine roll-off LPF, for example. Description will be made below with reference to an example of the configuration of the interpolation filter 89 shown in FIG. 7.

Figure 7:
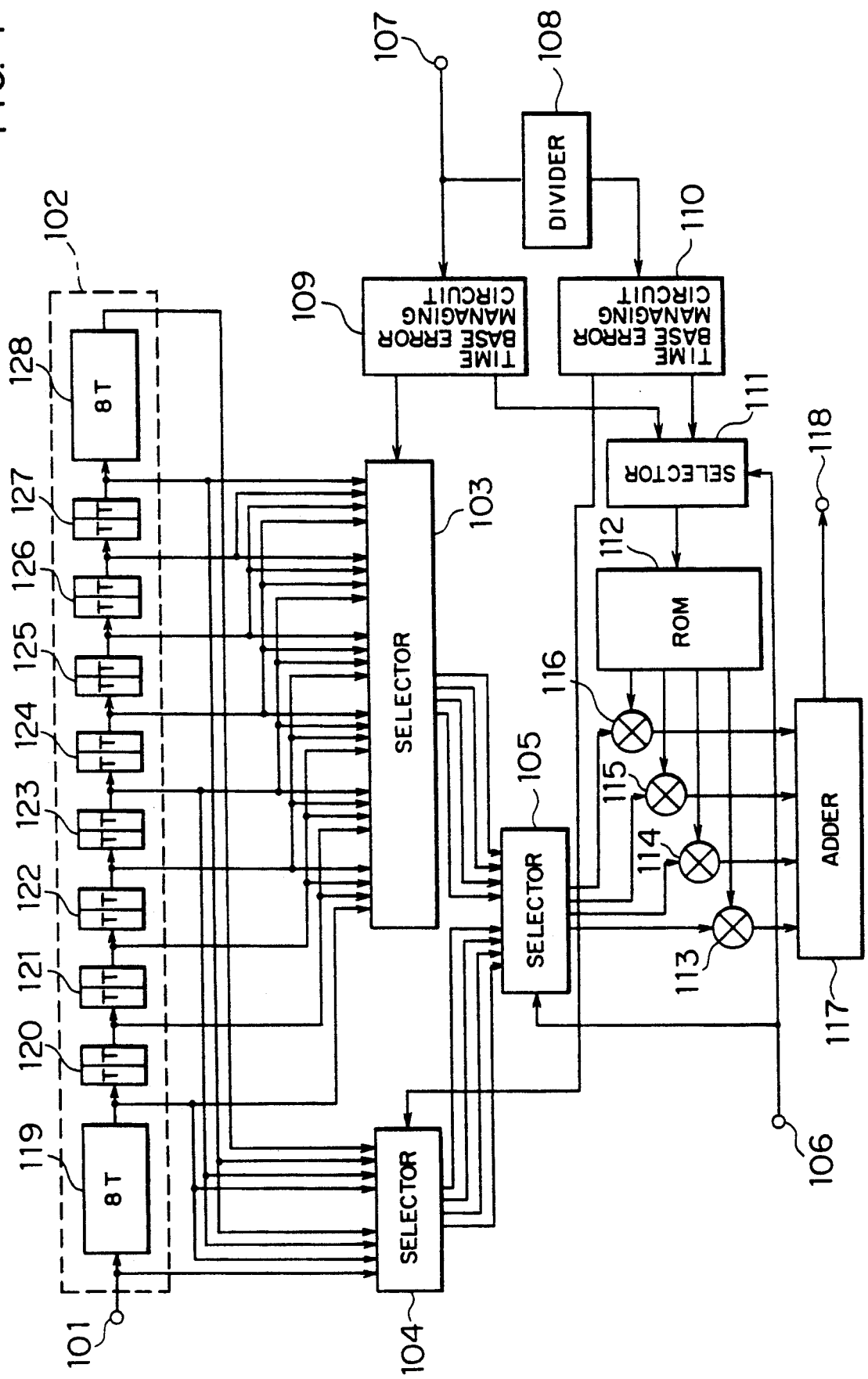
FIG. 7 is an example of the configuration of the interpolation unit for the time base corrector in FIG. 6.

FIG. 7 shows a case of interpolating based on four samples near the time of interpolation, as an example.

A signal from the multiplex 88 is applied to a shift register 102 and a signal one clock before is sequentially sent to flip-flops 119 to 128 which are structural elements of the shift register. The flip-flops 119 and 128 comprise eight-stage flip-flops and the flip-flops 120 to 127 comprise two-stage flip-flops respectively. (T in FIG. 7 designates a number of stages.) A plurality of sets of data, each set of data including four sample points, for example, are applied to selectors 103 and 104 from the shift register 102. As a result, the selector 103 selects the signal Y and the selector 104 selects the signal U and the signal V.

Time base error information produced from a time base error detector 81 is applied from a terminal 107 to a time base error managing circuit 109 and a divider 108. The divider 108 divides the time base error information into one fourth and applies the result to a time base error managing circuit 110, because the signal U and the signal V are sampled in one fourth frequency of the signal Y. The time base error managing circuits 109 and 110 divide the input time base error information into time base errors of clock unit and time base errors of less than one clock time. The clock in this case refers to a clock used at the time of sampling. Outputs of time base errors in clock unit produced from the time base error managing circuits 109 and 110 are applied to the selectors 103 and 104, and based on this information, the selectors 103 and 104 produce one set of data respectively. The outputs from the selectors 103 and 104 are applied to a selector 105.

A clock produced from a clock generator 83 is applied from a terminal 106 to the selector 105 and the signals are selected by types of the signal Y, the signal U, the signal V and a color signal by the clock applied, and one set of data is applied to each of multipliers 113 to 116.

In the mean time, time base errors of less than one clock time produced from the time base error managing circuits 109 and 110 are applied to a selector 111. The selector 111 selects time base errors for the signal Y, the signal U and the signal V in the same manner as the selector 105, and the result is applied to a ROM 112. The ROM 112 generates coefficients of impulse response for interpolation based on the input time base errors of less than on clock time, and applies the result to multipliers 113 to 116.

The multipliers 113 to 116 multiply data with the coefficients and produce the result to an adder 117. The adder 117 adds the outputs from the multipliers 113 to 116 and produces the result as an output signal from the interpolation filter 89 having a reference time base, to a terminal 118.

In the interpolation filter 89, the shift register 102 and the multipliers 113 to 116 operate in the clock of 27 MHz and time base error information is supplied by the clock of 13.5 MHz. This means that next time base error information is applied after the signal Y and the subsequent color signal are processed in the conceptual diagram on the time base in FIG. 8I.

An output from the interpolation filter 89 is applied to a separator 90, which separates the previously performed time base multiplex and returns the data to the data of the original time base.

An output from the separator 90 is applied to D/A converters 91, 92 and 93, in which the data are converted into analog signals by the clock of a constant time interval produced from the frequency dividers 84 and 86 and the results are produced as time-base variation-corrected signals, from terminals 94, 95 and 96.

As described above, according to the present embodiment, it is possible to detect time base variations from signals which have been sampled by a clock of a predetermined time interval and to correct the time base variations by using an interpolation filter on the same clock. Further, it is possible to reduce the scale of the circuits by having the interpolation filter 89 of a relatively large circuit scale structured to process time-base multiplex signals.

In the first embodiment of the present invention, the interpolation filter 9 has a structure of the FIR filter. However, the interpolation filter 9 may also be realized by the IIR filter structure which can vary the group delay by controlling cyclic coefficients, instead.

In the first and second embodiments of the present invention, the case of interpolating from four samples near the time of interpolation has been explained. However, the number of sample data to be used for the interpolation is not limited.

What is claimed is:

1. A time base corrector comprising:
   a clock generator for generating a clock signal of a constant time interval;
   an A/D converter for sampling an input signal by a clock signal produced from said clock generator and for converting the sampled signal into a digital signal;
   a memory for temporarily storing a digital signal obtained by said A/D converter;
   a horizontal synchronizing detector for detecting a horizontal synchronizing signal in said digital signal obtained by said A/D converter and for outputting a detected horizontal synchronizing signal;
   a write address generator for resetting a write address of said memory each time when said detected horizontal synchronizing signal is detected;
   a time base error detector for detecting a time base error in the digital signal obtained by said A/D converter and for outputting time base error information to be used for an interpolation based on the detected error;
   an interpolation filter for obtaining a digital signal having a reference time base by interpolating an amplitude of a digital signal produced from said memory based on time base error information produced from said time base error detector; and
   a D/A converter for converting an output signal from said interpolation filter into an analog signal by a clock signal produced from said clock generator.

2. A time base corrector according to claim 1, wherein said interpolation filter comprises: delay means having cascade connection of a plurality of delay circuits for obtaining a plurality of sample values by delaying an input signal of said interpolation means; selectors for selecting a predetermined number of sample values from said plurality of delay circuits based on time base error information from the time base error detector; a plurality of multipliers for multiplying a predetermined number of sample values selected by said selectors with coefficients based on time base error information from said time base error detector; and an adder for adding outputs from said plurality of multipliers to obtain an interpolation output from said interpolation filter.

3. A time base corrector according to claim 1, wherein said time base error detector has a time base error calculating circuit for obtaining and outputting a time base error smaller than one clock time of said clock signal in a digital signal by an arithmetic operation, and outputs time base errors to be corrected for each time when said detected horizontal synchronizing signal is received by using an output from said time base error calculating circuit.

4. A time base corrector according to claim 1, wherein said time base error detector comprises: a time base error calculating circuit for obtaining and outputting a time base error smaller than one clock time of said clock signal in a digital signal by an arithmetic operation; and a velocity error detector for obtaining an error from a fixed predetermined reference horizontal scanning time by using an output from said time base error calculating circuit; and produces output time base errors to be corrected for each clock time of said clock signal by using an output from said time base error calculating circuit and an output from said velocity error detector.

* * * * *